No. 774,825. PATENTED NOV. 15, 1904.
K. VON BOECKMANN.
SELF CENTERING AXLE LATHE.
APPLICATION FILED JAN. 19, 1904.
NO MODEL.

Witnesses
Edwin L Bradford
A. E. Glascock

Inventor
K. Von Boeckmann

By Hayden Jewell
Attorneys

No. 774,825.

Patented November 15, 1904.

UNITED STATES PATENT OFFICE.

KURT VON BOECKMANN, OF AUSTIN, TEXAS.

SELF-CENTERING AXLE-LATHE.

SPECIFICATION forming part of Letters Patent No. 774,825, dated November 15, 1904.

Application filed January 19, 1904. Serial No. 189,730. (No model.)

*To all whom it may concern:*

Be it known that I, KURT VON BOECKMANN, a citizen of the United States, residing at Austin, in the county of Travis and State of Texas, have invented new and useful Improvements in Self-Centering Axle-Lathes, of which the following is a specification.

My invention has relation to self-centering axle-lathes; and it consists in the novel construction and arrangement of its parts, as hereinafter shown and described.

The object of the invention is to provide a lathe for cutting off the end of the axle and also cutting back the nut-shoulder. As it is essential that the surfaces at these two points should be parallel and that the nut-shoulder should be cut with uniform depth, it is essential that the lathe during the process of cutting be located concentric with relation to the longitudinal axis of the axle. To accomplish this, the lathe is provided with a centering means located at the end thereof and adapted to engage an intermediate portion of the axle and position the end of the lathe concentrically with relation to the intermediate portion of the axle. The lathe is also provided with a means for engaging the center of the end of the axle and concentrically positioning an intermediate portion of the said lathe with relation to the end of the axle. Between the two said means the lathe is provided with a means which is adapted to positively engage the axle and maintain the proper relative position between the said axle and the lathe. The lathe is provided with a rotatable cutter-head carrying suitable tools which are adapted to to cut the axle end and the nut-shoulder. A suitable means is provided for rotating said cutter-head, and a means is also provided for moving said cutter-head longitudinally independent of the rotary cutting movement of the cutter-head.

Figure 1:
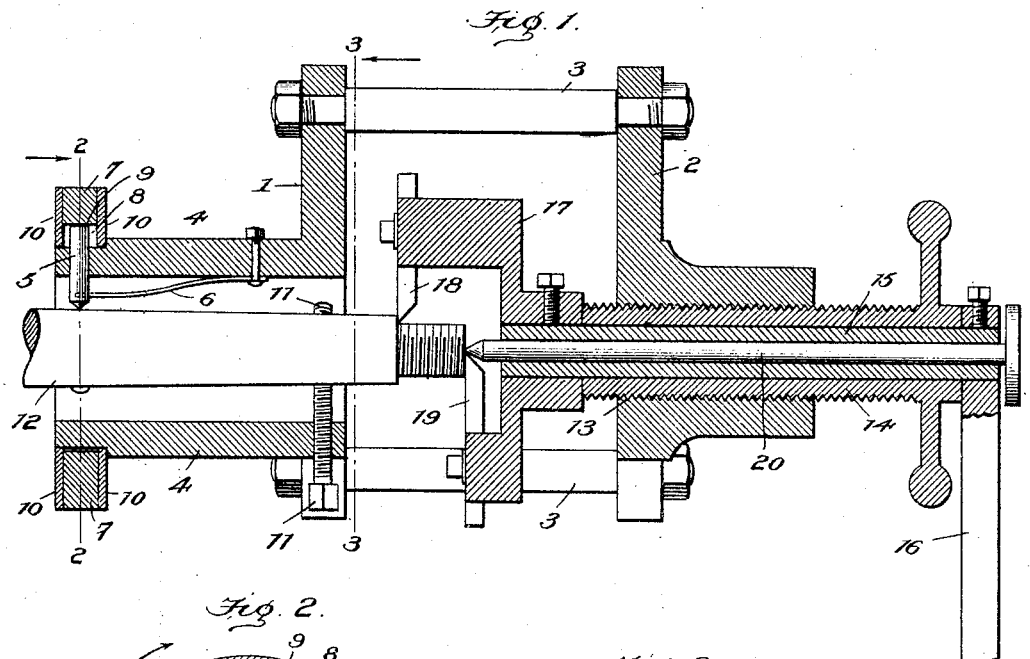
Figure 2:
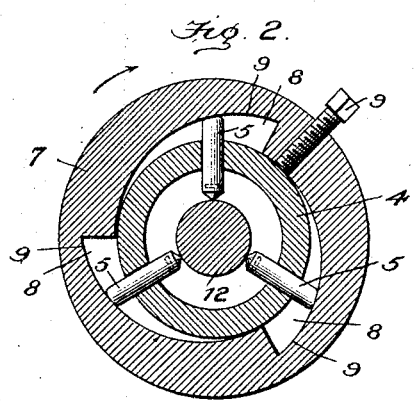
Figure 3:
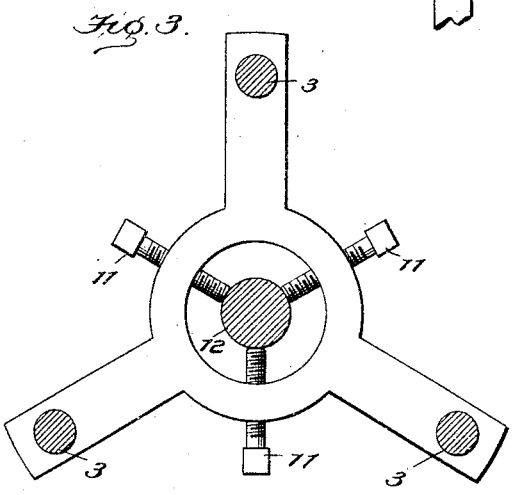
Figure 4:
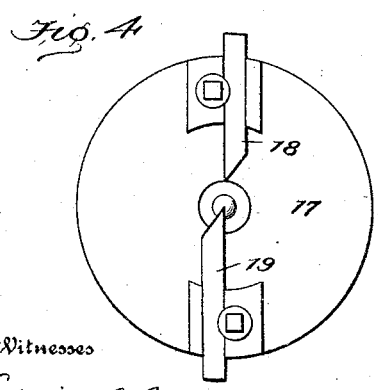

In the accompanying drawings, Figure 1 is a longitudinal sectional view of the self-centering axle-lathe applied to the end of an axle. Fig. 2 is a transverse sectional view cut on the line 2 2 of Fig. 1. Fig. 3 is a transverse sectional view of the lathe, cut on the line 3 3 of Fig. 1; and Fig. 4 is a face view of the cutter-head.

The lathe consists of the spiders 1 and 2, each being provided with an open center and said spiders being secured together by means of the bolts 3 3. The outer face of the spider 1 is provided with the annular portion 4, which surrounds the central opening of the said spider. The outer surface of the said portion 4 is circular. The pins 5 5 extend radially through the said portion 4, each pin being attached to a spring 6 one end of which is attached to the inner surface of the said portion 4. The tension of the said spring 6 is such as to have a tendency to spread the said pins 5 away from each other. The ring 7 surrounds the portion 4 and is provided in its inner face with the cam-recesses 8, which receive the outer ends of the pins 5. The bottoms 9 of the said recesses 8 are formed on lines extending substantially tangential to the outer surface of the portion 4. The said ring 7 is provided with a set-screw 9, the inner end of which is adapted to come in contact with the outer surface of the portion 4. The sides of the ring 7 are provided with the plates 10 10, which prevent the said ring from becoming dislocated with relation to the pins 5 5.

The spider 1 is provided with the radially-extending threaded bolts 11 11, the inner ends of which are adapted to engage the axle 12 and positively hold the lathe in fixed position with relation to the said axle.

The spider 2 is internally threaded, as at 13, in its central opening, and the externally-threaded sleeve 14 engages the said thread 13. The collar 15 is journaled within the sleeve 14 and is provided at its outer end with a crank-handle 16. The cutter-head 17 is located between the spiders 1 and 2 and is attached to the sleeve 15. The said cutter-head 17 carries the tools 18 and 19, which are adapted to cut the nut-shoulder and the end of the axle 12. The centering-pin 20 passes through the sleeve 15 and is adapted to engage the end of the axle 12.

In applying the lathe the axle 12 is slipped between the inner ends of the pins 5. The ring 7 is then turned in the direction of the arrow shown in Fig. 2, and the bottoms 9 of the recesses 8 force the pins 5 against the tension of the spring 6 in engagement with the axle 12, and thus the end of the axle-lathe is concentrically located with relation to the intermediate portion of the axle 12. The setscrew 9 is then tightened and the ring 7 is held in position with relation to the portion 4. The inner end of the pin 20 is then placed in the center of the end of the axle 12, and thus the intermediate portion of the lathe is concentrically located with relation to the end of the axle 12. The bolts 11 11 are then brought in hard contact with the axle 12, and thus the lathe is positively held in proper position with relation to the said axle. The operator may then rotate the collar 15 and cutter-head 17 by turning the crank 16. As the said cutter-head 17 rotates the tools 18 and 19 cut the nut-shoulder and end of the axle.

The cutter-head 17 may be moved longitudinally by turning the sleeve 14.

Having described my invention, what I claim as new, and desire to secure by Letters Patent, is—

An axle-lathe consisting of a spider, a means for concentrically locating said spider with relation to the axle, a second spider attached to the first said spider and having a means for concentrically locating the second said spider with relation to the axle consisting of a longitudinally-movable pin passing therethrough, a sleeve threaded in said second spider, a collar journaled in said sleeve, a cutter-head attached to said collar, said pin passing through said collar.

In testimony whereof I have signed my name to this specification in the presence of two subscribing witnesses.

KURT VON BOECKMANN.

Witnesses:
E. C. DYER,
E. S. CLUCK.